(12) United States Patent
McCune et al.

(10) Patent No.: US 11,174,936 B2
(45) Date of Patent: *Nov. 16, 2021

(54) FLEXIBLE SUPPORT STRUCTURE FOR A GEARED ARCHITECTURE GAS TURBINE ENGINE

(71) Applicant: RAYTHEON TECHNOLOGIES CORPORATION, Farmington, CT (US)

(72) Inventors: Michael E. McCune, Colchester, CT (US); Jason Husband, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/747,934

(22) Filed: Jan. 21, 2020

(65) Prior Publication Data

US 2020/0158226 A1    May 21, 2020

Related U.S. Application Data

(63) Continuation of application No. 15/185,292, filed on Jun. 17, 2016, now Pat. No. 10,539,222, which is a
(Continued)

(51) Int. Cl.
*F01D 25/16* (2006.01)
*F02C 7/36* (2006.01)
(Continued)

(52) U.S. Cl.
CPC ......... *F16H 57/028* (2013.01); *F01D 25/164* (2013.01); *F02C 7/36* (2013.01);
(Continued)

(58) Field of Classification Search
CPC .... F02C 7/20; F02C 7/36; F01D 15/12; F01D 25/164; F05D 2260/40311
See application file for complete search history.

(56) References Cited

U.S. PATENT DOCUMENTS 2,258,792 A    4/1941    New
2,936,655 A    5/1960    Peterson et al.
(Continued)

FOREIGN PATENT DOCUMENTS

CA    2789325    4/2013
CA    2789465    4/2013
(Continued)

OTHER PUBLICATIONS

Winn, A. (Ed). (1990). Wide Chord Fan Club. Flight International, 4217(137). May 23-29, 1990. pp. 34-38.
(Continued)

*Primary Examiner* — Justin D Seabe
(74) *Attorney, Agent, or Firm* — Carlson, Gaskey & Olds, P.C.

(57) ABSTRACT

A gas turbine engine includes a fan shaft that drives a fan that has fan blades. The fan delivers airflow to a bypass duct. A gear system is connected to the fan shaft and is driven through an input defining an input lateral stiffness and an input transverse stiffness. A gear system flex mount arrangement accommodates misalignment of the fan shaft and the input during operation. A frame for supporting the fan shaft defines a frame lateral stiffness and a frame transverse stiffness. The input lateral stiffness is less than 11% of the frame lateral stiffness and the input transverse stiffness is less that 11% of the frame transverse stiffness.

27 Claims, 8 Drawing Sheets

Related U.S. Application Data continuation of application No. 13/938,466, filed on Jul. 10, 2013, now Pat. No. 9,410,608, which is a continuation of application No. 13/623,309, filed on Sep. 20, 2012, now Pat. No. 9,133,729, which is a continuation-in-part of application No. 13/342,508, filed on Jan. 3, 2012, now Pat. No. 8,297,916.

(60) Provisional application No. 61/494,453, filed on Jun. 8, 2011.

(51) Int. Cl.
| | | |
|---|---|---|
| *F16H 57/028* | (2012.01) | |
| *F02K 3/06* | (2006.01) | |
| *F04D 25/02* | (2006.01) | |
| *F04D 29/053* | (2006.01) | |
| *F04D 29/056* | (2006.01) | |
| *F16H 1/28* | (2006.01) | |

(52) U.S. Cl.
CPC .............. *F02K 3/06* (2013.01); *F04D 25/028* (2013.01); *F04D 29/053* (2013.01); *F04D 29/056* (2013.01); *F16H 1/28* (2013.01); *F05D 2220/323* (2013.01); *F05D 2260/40311* (2013.01); *F05D 2300/501* (2013.01)

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,084,861 A * | 4/1978 | Greenberg ............ F01D 25/164 384/105 |
| 4,090,416 A * | 5/1978 | Hicks ..................... F16D 3/185 475/317 |
| 4,130,872 A | 12/1978 | Harloff |
| 4,201,513 A | 5/1980 | Sales |
| 4,220,171 A | 9/1980 | Ruehr |
| 4,221,114 A | 9/1980 | Wilde et al. |
| 4,240,250 A | 12/1980 | Harris |
| 4,275,557 A | 6/1981 | Marvin et al. |
| 4,284,174 A | 8/1981 | Salvana et al. |
| 4,289,360 A | 9/1981 | Zirin |
| 4,478,551 A | 10/1984 | Honeycutt, Jr. et al. |
| 4,649,114 A | 3/1987 | Miltenburger et al. |
| 4,696,156 A | 9/1987 | Burr et al. |
| 4,722,357 A | 2/1988 | Wynosky |
| 4,825,644 A | 5/1989 | Bubello |
| 4,825,723 A | 5/1989 | Martin |
| 4,979,362 A | 12/1990 | Vershure, Jr. |
| 5,058,617 A | 10/1991 | Stockman et al. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,486,553 A | 1/1996 | Deaner et al. |
| 5,524,847 A | 6/1996 | Brodell et al. |
| 5,539,027 A | 7/1996 | Deaner et al. |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,073,439 A | 6/2000 | Beaven et al. |
| 6,223,616 B1 | 5/2001 | Sheridan |
| 6,260,351 B1 | 7/2001 | Delano |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,647,707 B2 | 11/2003 | Dev |
| 6,663,530 B2 | 12/2003 | Poulin et al. |
| 6,709,492 B1 | 3/2004 | Spadaccini et al. |
| 6,735,954 B2 | 5/2004 | MacFarlane et al. |
| 6,814,541 B2 | 11/2004 | Evans et al. |
| 6,855,089 B2 | 2/2005 | Poulin et al. |
| 6,883,303 B1 | 4/2005 | Seda |
| 6,895,741 B2 | 5/2005 | Rago et al. |
| 7,021,042 B2 | 4/2006 | Law |
| 7,104,918 B2 | 9/2006 | Mitrovic |
| 7,144,349 B2 | 12/2006 | Mitrovic |
| 7,219,490 B2 | 1/2007 | Dev |
| 7,223,197 B2 | 5/2007 | Poulin et al. |
| 7,328,580 B2 | 2/2008 | Lee et al. |
| 7,374,403 B2 | 5/2008 | Decker et al. |
| 7,393,182 B2 | 7/2008 | Matheny |
| 7,451,592 B2 | 11/2008 | Taylor et al. |
| 7,591,754 B2 | 9/2009 | Duong et al. |
| 7,631,484 B2 | 12/2009 | Giffin et al. |
| 7,632,064 B2 | 12/2009 | Somanath et al. |
| 7,662,059 B2 | 2/2010 | McCune |
| 7,665,293 B2 | 2/2010 | Wilson et al. |
| 7,704,178 B2 | 4/2010 | Sheridan |
| 7,806,651 B2 | 10/2010 | Kennepohl et al. |
| 7,824,305 B2 | 11/2010 | Duong et al. |
| 7,828,682 B2 | 11/2010 | Smook |
| 7,841,163 B2 | 11/2010 | Welch et al. |
| 7,841,165 B2 | 11/2010 | Orlando |
| 7,926,260 B2 | 4/2011 | Sheridan et al. |
| 7,959,532 B2 | 6/2011 | Suciu et al. |
| 7,997,868 B1 | 8/2011 | Liang et al. |
| 8,001,763 B2 | 8/2011 | Grabowski et al. |
| 8,172,717 B2 | 5/2012 | Lopez et al. |
| 8,205,432 B2 | 6/2012 | Sheridan |
| 8,297,916 B1 | 10/2012 | McCune |
| 8,640,336 B2 | 2/2014 | Sheridan et al. |
| 9,133,729 B1 | 9/2015 | McCune et al. |
| 9,239,012 B2 | 1/2016 | McCune et al. |
| 9,297,917 B2 | 3/2016 | Mah et al. |
| 9,523,422 B2 | 12/2016 | McCune et al. |
| 9,631,558 B2 | 4/2017 | McCune et al. |
| 9,752,511 B2 | 9/2017 | McCune et al. |
| 10,301,968 B2 | 5/2019 | McCune |
| 10,590,802 B2 | 3/2020 | McCune et al. |
| 2006/0228206 A1 | 10/2006 | Decker et al. |
| 2007/0214795 A1 | 9/2007 | Cooker et al. |
| 2007/0225111 A1 | 9/2007 | Duong et al. |
| 2007/0265133 A1 | 11/2007 | Smook |
| 2008/0003096 A1 | 1/2008 | Kohli et al. |
| 2008/0044276 A1 | 2/2008 | McCune |
| 2008/0097813 A1 | 4/2008 | Orlando et al. |
| 2008/0098713 A1 | 5/2008 | Orlando et al. |
| 2008/0098718 A1 | 5/2008 | Henry |
| 2008/0116009 A1 | 5/2008 | Sheridan et al. |
| 2008/0317588 A1 | 12/2008 | Grabowski et al. |
| 2009/0056306 A1 | 3/2009 | Suciu et al. |
| 2009/0056343 A1 | 3/2009 | Suciu et al. |
| 2009/0074565 A1 | 3/2009 | Suciu et al. |
| 2009/0090096 A1 | 4/2009 | Sheridan |
| 2009/0145102 A1 | 6/2009 | Roberge et al. |
| 2009/0151317 A1 | 6/2009 | Norris et al. |
| 2009/0183512 A1 | 7/2009 | Suciu et al. |
| 2009/0304518 A1 | 12/2009 | Kodama et al. |
| 2009/0314881 A1 | 12/2009 | Suciu et al. |

(56) References Cited

U.S. PATENT DOCUMENTS

| | | | |
|---|---|---|---|
| 2010/0105516 | A1 | 4/2010 | Sheridan et al. |
| 2010/0132376 | A1 | 6/2010 | Durocher et al. |
| 2010/0148396 | A1 | 6/2010 | Xie et al. |
| 2010/0212281 | A1 | 8/2010 | Sheridan |
| 2010/0218483 | A1 | 9/2010 | Smith |
| 2010/0331139 | A1 | 12/2010 | McCune |
| 2011/0106510 | A1 | 5/2011 | Poon |
| 2011/0116510 | A1 | 5/2011 | Breslin et al. |
| 2011/0130246 | A1* | 6/2011 | McCune ............... F01D 25/164 477/115 |
| 2011/0159797 | A1 | 6/2011 | Beltman et al. |
| 2011/0165983 | A1 | 7/2011 | Fox |
| 2011/0208400 | A1 | 8/2011 | Lickfold et al. |
| 2011/0286836 | A1 | 11/2011 | Davis |
| 2011/0293423 | A1 | 12/2011 | Bunker et al. |
| 2012/0124964 | A1 | 5/2012 | Hasel et al. |
| 2013/0219913 | A1 | 8/2013 | McCune et al. |
| 2013/0224003 | A1 | 8/2013 | Kupratis et al. |
| 2013/0259650 | A1 | 10/2013 | Schwarz |
| 2013/0287575 | A1 | 10/2013 | McCune |
| 2013/0310213 | A1 | 11/2013 | Matsuoka et al. |
| 2013/0331223 | A1 | 12/2013 | McCune et al. |
| 2013/0331224 | A1 | 12/2013 | McCune |
| 2014/0020404 | A1 | 1/2014 | Sheridan et al. |
| 2014/0140819 | A1 | 5/2014 | McCune et al. |
| 2014/0174056 | A1 | 6/2014 | Suciu et al. |

FOREIGN PATENT DOCUMENTS

| | | |
|---|---|---|
| EP | 253548 | 1/1988 |
| EP | 0791383 | 8/1997 |
| EP | 2270361 | 1/2001 |
| EP | 1142850 | 10/2001 |
| EP | 2270361 | 1/2011 |
| EP | 2532841 | 12/2012 |
| EP | 2532858 | 12/2012 |
| EP | 2551488 | 1/2013 |
| EP | 2551488 | 10/2013 |
| EP | 2949881 | 12/2015 |
| EP | 2809931 | 7/2016 |
| GB | 1516041 | 6/1978 |
| GB | 2041090 | 9/1980 |
| GB | 2426792 | 12/2006 |
| WO | 2007038674 | 4/2007 |
| WO | 2013116262 | 8/2013 |
| WO | 2013154636 | 10/2013 |
| WO | 2014047040 | 3/2014 |

OTHER PUBLICATIONS

Parker, R.G. and Lin, J. (2001). Modeling, modal properties, and mesh stiffness variation instabilities of planetary gears. Prepared for NASA. NASA/CR-2001-210939. May 2001. pp. 1-111.

Mancuso, J. R. and Corcoran, J.P. (2003). What are the differences in high performance flexible couplings for turbomachinery? Proceedings of the Thirty-Second Turbomachinery Symposium. 2003 pp. 189-207.

Dudley, D.W., Ed. (1954). Handbook of practical gear design. Lancaster, PA: Technomic Publishing Company, Inc. pp. 3.96-102 and 8.12-18.

Dudley, D.W., Ed. (1962). Gear handbook. New York, NY: McGraw-Hill. pp. 3.14-18 and 12.7-12.21.

Dudley, D.W., Ed. (1994). Practical gear design. New York, NY: McGraw-Hill. pp. 119-124.

Product Brochure. Garrett TFE731. Allied Signal. Copyright 1987. pp. 1-24.

Honeywell Learjet 31 and 35/36 TFE731-2 to 2C Engine Upgrade Program. Sep. 2005. pp. 1-4.

Honeywell Sabreliner 65 TFE731-3 to -3D Engine Upgrade Program. Oct. 2005. pp. 1-4.

U.S. Department of Transportation: Federal Aviation Administration Type Certificate Data Sheet No. E6WE. Dated: May 9, 2000. p. 1-9.

Kurzke, J. (2012). GasTurb 12: Design and off-design performance of gas turbines. Retrieved from: https://www.scribd.com/document/153900429/GasTurb-12.

Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.

Riegler, C., and Bichlmaier, C. (2007). The geared turbofan technology—Opportunities, challenges and readiness status. Porceedings CEAS. Sep. 10-13, 2007. Berlin, Germany pp. 1-12.

About GasTurb. Retrieved Jun. 26, 2018 from: http://gasturb.de/about-gasturb.html.

Kurzke, J. (2001). GasTurb 9: A program to calculate design and off-design performance of gas turbines. Retrieved from: https://www.scribd.com/document/92384867/GasTurb9Manual.

Tummers, B. (2006). DataThief III. Retreived from: https://datathief.org/DatathiefManual.pdf pp. 1-52.

Manual. Student's Guide to Learning SolidWorks Software. Dassault Systemes—SolidWorks Corporation, pp. 1-156.

Macisaac, B. and Langston, R. (2011). Gas turbine propulsion systems. Chichester, West Sussex: John Wiley & Sons, Ltd. pp. 260-265.

Datasheet. CFM56-5B for the Airbus A320ceo family and CFM56-7B for the Boeing 737 family. https://www.cfmaeroengines.com/.

Turner, M. G., Norris, A., and Veres, J.P. (2004). High-fidelity three-dimensional simulation of the GE90. NASA/TM-2004-212981. pp. 1-18.

Defeo, A. and Kulina, M. (1977). Quiet clean short-haul experimental engine (QCSEE) main reduction gears detailed design final report. Prepared for NASA. NASA-CR-134872. Jul. 1977. pp. 1-221.

Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.

Singh, A. (2005). Application of a system level model to study the planetary load sharing behavior. Jounal of Mechanical Design. vol. 127. May 2005. pp. 469-476.

Smith-Boyd, L. and Pike, J. (1986). Expansion of epicyclic gear dynamic analysis program. Prepared for NASA. NASA CR-179563 Aug. 1986 pp. 1-98.

Wikipedia. Torsion spring. Retreived Jun. 29, 2018 from: https://en.wikipedia.org/wiki/Torsion_spring.

Agma Standard (2006). Design manual for enclosed epicyclic gear drives. Alexandria, VA: American Gear Manufacturers Association, pp. 1-104.

Agma Standard (1997). Design and selection of components for enclosed gear drives, lexandria, VA: American Gear Manufacturers Association, pp. 1-48.

Daly, M. Ed. (2007). Jane's Aero-Engine. Issue Twenty-three. Mar. 2008. p. 707-12.

Agma Standard (1999). Flexible couplings—Mass elastic properties and other characteristics. Alexandria, VA: American Gear Manufacturers Association pp. 1-46.

Wikipedia. Stiffness. Retrieved Jun. 28, 2018 from: https://en.wikipedia.org/wiki/Stiffness.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Ciepluch, C. (1977). Quiet clean short-haul experimental engine (QCSEE) under-the-wing (UTW) final design report. Prepared for

(56) References Cited

OTHER PUBLICATIONS

NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983 pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Mattingly, J.D. (1996). Elements of gas turbine propulsion. New York, New York: McGraw-Hill, Inc. pp. 1-18, 30-62, 223-234, 462-479, 517-520, 757-767, and 862-864.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Johnston, R.P. and Hemsworth, M.C. (1978). Energy efficient engine preliminary design and integration studies. Jun. 1, 1978 pp. 1-28.
Awker, R.W. (1986). Evaluation of propfan propulsion applied to general aviation. NASA CR-175020. Mar. 1, 1986 pp. 1-140.
Howe, D.C. and Wynosky, T.A. (1985). Energy efficient engine program advanced turbofan nacelle definition study. NASA CR-174942. May 1, 1985. pp. 174.
Singh, B. (1986). Small engine component technology (SECT) study. NASA CR-175079. Mar. 1, 1986. pp. 1-102.
Liebeck, R.H., Andrastek, D.A., Chau, J., Girvin, R., Lyon, R., Rawdon, B.K., Scott, P.W et al. (1995). Advanced subsonic airplane design & economics studies. NASA CR-195443 Apr. 1995. pp 1-187.
Anderson, R.D. (1985). Advanced Propfan Engine Technology (APET) definition study, single and counter-rotation gearbox/pitch change mechanism design. NASA CR-168115. Jul. 1, 1985. pp 1-289.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Gliebe, P.R., Ho, P.Y., and Mani, R. (1995). UHB engine fan and broadband noise reduction study. NASA CR-198357. Jun. 1995. pp. 1-48.
Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.
Kandebo, S.W. (1998). Geared-Turbofan engine design targets cost, complexity. Aviation Week & Space Technology, 148(8). p. 34-5.
Davis, D.G.M. (1973). Variable-pitch fans: Progress in Britain. Flight International. Apr. 19, 1973. pp. 615-617.
Levintan, R.M. (1975). Q-Fan demonstrator engine. Journal of Aircraft. vol. 12( 8). Aug. 1975. pp. 658-663.
Technical Report. (1975). Quiet Clean Short-haul Experimental Engine (QCSEE) UTW fan preliminary design. NASA-CR-134842. Feb. 1, 1975. pp 1-98.
Aerospace Information Report. (2008). Advanced ducted propulsor in-flight thrust determination. SAE International AIR5450. Aug. 2008. p. 1-392.
Daggett, D.L., Brown, S.T., and Kawai, R.T. (2003). Ultra-efficient engine diameter study. NASA/CR-2003-212309. May 2003. pp. 1-52.
Third Party Observations and Concise Description of Relevance of Document for U.S. Appl. No. 15/816,487 dated Jul. 25, 2018.
U.S. Appl. No. 61/494,453, filed Jun. 8, 2011 titled Geared Engine Flexible Mount Arrangement.
Third Party Observations and Concise Description of Relevance of Document for U.S. Appl. No. 15/856,396 dated Aug. 31, 2018.
Dr. Raymond G. Tronzo v. Biomet Inc., 156 F.3d 1154 (1998).
Third Party Observations and Concise Description of Relevance of Document for U.S. Appl. No. 15/881,240 dated Aug. 31, 2018.
Third Party Observations and Concise Description of Relevance of Document for U.S. Appl. No. 15/185,292 dated Jul. 5, 2018.
Response to Observations by Patantee filed by Rolls Royce on Jan. 18, 2019 for European Patent No. EP2532858B1 granted Oct. 19, 2016.
Response to Observations by Patantee filed by Rolls Royce on Jul. 18, 2018 for European Patent No. EP2737180B1 granted Apr. 13, 2016.
Response to Observations by Patantee filed by Rolls Royce on Jul. 18, 2018 for European Patent No. EP2532841B1 granted Apr. 27, 2016.
EP Office Action for European Application No. 16174051.9 dated Oct. 15, 2018.
EP Office Action for European Application No. 17199484.1 dated Jan. 2, 2019.
EP Office Action for European Application No. 16159312.4 dated Oct. 16, 2018.
EP Extended Search Report from EP Application No. 19199343.5, dated Jan. 10, 2020.
D6—Preliminary opinion of the opposition division issued in the framework of the opposition procedure against patent EP 2 949 882 (Application No. 15175205.2).
D7—Preliminary opinion of the opposition division issued in the framework of the opposition procedure against patent EP 3 051 078 (Application No. 16155413.4).
D8—Preliminary opinion of the opposition division issued in the framework of the opposition procedure against patent EP 2 949 881 (Application No. 15175203.7).
D9—Annex to communication 94(3) EPC—patent EP 3 296 526—dated Feb. 1, 2019 (Application No. 17199484.1).
D10—Annex to communication 94(3) EPC—EP 3 296 526—dated Feb. 27, 2020 (Application No. 17199484.1).
D11—Article Amezketa, Miguel, "Dynamical Model of Helical Gear pair with backlash and angle-varying mesh stiffness" Multibody Dynamics 2009, ECCOMAS Thematic Conference.
Foreign copy and English Translation on the back of Opposition to European Patent No. EP3097275 granted Sep. 25, 2019 filed on behalf of Safran Aircraft Engines dated Jul. 1, 2020.
D12—Priority document U.S. Appl. No. 14/160,601 dated Jan. 22, 2014.
Singh, Avinash, Load Sharing Behavior in Epicyclic Gears:Physical Explanation and Generalized Formulation. Mechanism and Machine Theory, vol. 45. 2010, 20 pgs.
NASA Lewis Research Center, Quiet Clean Short_Haul Experimental Engine (QCSEE) Main Reduction Gears Detailed Design Final report. NASA CR_134872, Mar. 1975. 222 pgs.

(56) References Cited

OTHER PUBLICATIONS

Notice of Opposition from Rolls Royce for Application No. 16159312.4 (Patent No. EP3045684) dated Dec. 14, 2020.
Notice of Opposition from Rolls Royce for Application No. 16174051.9 (Patent No. EP3098396) dated Dec. 14, 2020.
Brief Communication—Summons to attend oral proceedings for Application No. 15777258.3 dated Feb. 1, 2021.
Third Party Observations of European Patent Application No. 17199484.1 (EP 3296526)) dated Oct. 30, 2019 by Rolls Royce.
EP Search Report for EP Application No. 18191333.6 dated Mar. 7, 2019.
EP Search Report for EP Application No. 18191325.2 dated Mar. 7, 2019.
Kiekbusch, "A common formula for the combined torsional mesh stiffness of spur gears", 2007, 5th Australasian Congress on Applied Mechanics, ACAM 2007 (Year: 2007).
Peter Lynwander of American Lohmann Corporation, New Jersey, "Gear Drive Systems: Design and Application", 1983 Marcel Dekker Inc. NY and Basel, GE-1018.008 PP. (year 1983).
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Pod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002 pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

(56) References Cited

OTHER PUBLICATIONS

Thulin, R.D., Howe, D.C., and Singer, I.D. (1982). Energy efficient engine: High pressure turbine detailed design report Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I) Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 50-62, 85-87, 95-104, 121-123, 223-234, 242-245, 278-285, 303-309, 323-326, 462-479, 517-520, 563-565, 630-632, 568-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retreived from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx ™ high bypass turbofan engines. Retreived from: https://www.geaviation.com/sites/default/files/datasheet-genx.pdf.
Optimised Gearbox Design for Modern Wind Turbines. Hicks, Cunliffe and Gifer; Nov. 20, 20014.
ANSI-AGMA 9004-A99 Flexible Couplings—Mass Elastic Properties and Other Characteristics.AGMA Standard. Approved Aug. 3, 1999.
ANSI-AGMA 6123-B06—IDesign Manual for Enclosed Epicyclic Gear Drives—AGMA Standard. Approved Sep. 20, 2006.
ANSI-AGMA 940-A09-Double Helical Epicyclic Gear Units. AGMA Information Sheet. Approved Jan. 6, 2009.
Youtube video; "PurePower PW1000G Engine: Customer Testimonials", published Jul. 26, 2010 (~seconds 43-63) available at https:www.youtube.com/watch?v=vgQgEftEd8c on Aug. 9, 2018.
Request for Opinion filed by Rolls Royce on Jul. 11, 2018 for European Patent No. EP2532858B1 granted Oct. 19, 2016.
Request for Opinion filed by Rolls Royce dated Jul. 11, 2018 for European Patent No. EP2737180B1 granted Apr. 13, 2016.
Request for Opinion filed by Rolls Royce dated Jul. 11, 2018 for European Patent No. EP2532841B1 granted Apr. 27, 2016.
Decision to Deny Institution—Case IPR2018-01172, U.S. Pat. No. 8,297,916 B1. *General Electric Company*, Petitioner, v. *United Technologies Corporation*, Patent owner. Entered Nov. 29, 2018.
Decision to Deny Institution—Case IPR2018-01171, U.S. Pat. No. 8,297,916 B1. *General Electric Company*, Petitioner, v. *United Technologies Corporation*, Patent owner. Entered Nov. 29, 2018.
Wendus, B.E., Stark, D.F., Holler, R.P., and Funkhouser, M.E. (2003) "Follow-on technology requirement study for advanced subsonic transport". NASA/CR-2003-212467.
Garrett, (1987). "TFE731".

Roux, E. (2007) "Turbofan and turbojet engines database handbook". Editions Elodie Roux. Blagnac: France. p. 41-42; p. 465; p. 468-469.
Kurzke, J. (2009). Fundamental differences between conventional and geared turbofans. Proceedings of ASME Turbo Expo: Power for Land, Sea, and Air. 2009, GT2009-59745, Orlando, Florida.
Mattingly, J.D. (1996). Elements of gas turbine propulsion. New York, New York: McGraw-Hill, Inc.
Riegler, C. (2007) The Geared Turbofan Technology—Opportunities, Challenged and Readiness Status. Proceedings CEAS 2007.
Waters, M.H. and Schairer, E.T. (1977). Analysis of turbofan propulsion system weight and dimensions. NASA Technical Memorandum. NASA TM-X-73. Jan. 1977. p. 199.
Willis, W.S. (1979). Quiet clean short-haul experimental engine (QCSEE) final report. NASA/CR-159473 pp. 1-289.
Sweetman, B. and Sutton, O. (1998). Pratt & Whitney's surprise leap. Interavia Business & Technology, 53.621, p. 25.
Gunston, B. (Ed.) (2000). Jane's aero-engines, Issue seven. Coulsdon, Surrey, UK: Jane's Information Group Limited, pp. 510-512.
Brines, G.L. (1990). The turbofan of tomorrow. Mechanical Engineering: The Journal of the American Society of Mechanical Engineers, 108(8), 65-67.
Daly, M. Ed. (2010). Jane's Aero-Engine. Issue Twenty-seven. Mar. 2010. p. 633-636.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Lynwander, P. (1983). Gear drive systems: Design and application. New York, New York: Marcel Dekker, Inc. pp. 145, 355-358.
Hill, P.G. and Peterson, C.R. (1992). Mechanics and Thermodynamics of Propulsion, Second Edition. Addison-Wesley Publishing Company, pp. 400-406.
Kasuba, R. and August, R. (1984). Gear Mesh Stiffness and Load Sharing in Planetary Gearing. The American Society of Mechanical Engineers. New York, NY.
Hill, P.G. and Peterson, C.R. (1970). Mechanics and Thermodynamics of Propulsion. Addison-Wesley Series in Aerospace Science. Chapter 9-4.
Leckie, F.A. and Dal Bello, D.J. (2009). Strength and stiffness of engineering systems. Mechanical Engineering Series. Springer. pp. 1-10, 48-51.
Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
English translation of Measurement and calculation methodology on TFE731-2, TFE731-3A and TFE731-3D models.
English translation of Expert certificate concerning the technical nature of the drawings used in the measurement and calculation methodology.
Declaration of Raymond Drago. In re U.S. Pat. No. 8,297,916. IPR2018-01172. Executed May 29, 2018. pp. 1-115.
Declaration of Courtney H. Bailey. In re U.S. Pat. No. 8,511,605. Executed Jul. 19, 2016. pp. 1-4.
Daly, M. and Gunston, B. (2008). Jane's Aero-Engines. Pratt & Whitney PW8000. Issue Twenty-three.
Notice of Opposition to Patent No. EP2811120. United Technologies Corporation opposed by Rolls Royce. Dated Apr. 12, 2018.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Petition for Inter Partes Review of U.S. Pat. No. 8,297,916. *General Electric Company*, Petitioner, v. *United Technologies Corporation*, Patent Owner. IPR2018-01172. Filed May 30, 2018.
Notice of Opposition to Patent No. EP2949882. United Technologies Corporation opposed by Rolls Royce. Dated Aug. 23, 2017.
English Translation of Notice of Opposition to Patent No. EP2811120. United Technologies Corporation opposed by Safran Aircraft Engines. Dated Jul. 12, 2017.

(56) References Cited

OTHER PUBLICATIONS

English Translation of Notice of Opposition to Patent No. EP299882. United Technologies Corporation opposed by Safran Aircraft Engines. Dated May 23, 2018.

Princeton, "Composite Materials", https://www.princeton.edu/-humcomp/bikes/design/desi_30.htm, on Oct. 9, 2019 (Year: 2019).

Power Technology, "GE's H-Series Breaks 60% Fuel Efficiency Barrier", 2007, retrieved from https://www.power-technology.com/features/feature1084/ (Year: 2007).

Team CCJ, "Turbine blade, vane cooling—a primer", 2018, https://www.ccj-online.com/turbine-blade-vane-cooling-a-primer/ retrieved on Oct. 9, 2019 (Year: 2018).

Warwick, G., "Civil Engines: Pratt & Whitney gears up for the future with GTF", Flight International, Nov. 2007, accessed on Jul. 17, 2015 at http://www.flightglobal.com/news/articles/civil-engines-pratt-amp-whitney-gears-up-for-the-future-with-gtf.

Peter Coy, "The Little Gear That Could Reshape the Jet Engine", Bloomberg Business, Oct. 15, 2015 [accessed on Mar. 24, 2017 at https://www.bloomberg.com/news/articles/2015-10-15/pratt-s-purepower-gtf-jet-engine-innovation-took-almost-30-years].

Bill Read, "Powerplant Revolution", AeroSpace, May 2014, pp. 28-31.

Andreas Peters et al., "Ultrashort Nacelles for Low Fan Pressure Ratio Propulsors", Sep. 10, 2014, Journal of Turbomachinery 137(2), Abstract.

NASA, Quest for Performance: The Evolution of Modem Aircraft, Part II: The Jet Age, Chapter 10: Technology of the Jet Airplane, Turbojet and Turbofan Systems, Dec. 2006, NASA.

Jane's Aero-Engines, Issue Seven, Edited by Bill Gunston, Jane's Information Group Inc., Alexandria, Virginia, 2000, pp. 1-47, 61, and 464-512.

Boggia, S. and Rud, K., "Intercooled Recuperated Gas Turbine Engine Concept", AIAA 2005-4192,41st AIAA/ASME/SAE/ASEE Joint Propulsion Conference & Exhibit, Jul. 10-13, 2005, Tucson, Arizona, pp. 1-11.

Engber, et al., "Advanced Technologies for Next Generation Regional Jets—Survey of Research Activities at MTU Aero Engines", ISABE-2007-1282, Proceedings: XVIII International Symposium on Air Breathing Engines (ISABE), 18th ISABE Conference, Beijing, China, Sep. 2-7, 2007, pp. 1-11.

Kjelgaard, C., "Gearing Up for the GTF", Aircraft Technology, Issue 105, Apr.-May 2010, pp. 86, 88, 90, 92-95.

Third Party Observations for European Patent Application No. 16159312.4 filed Jun. 22, 2018. Dated Jul. 3, 2018.

Wikipedia. Torsion spring. Retrieved Jun. 29, 2018 from: https://en.wikipedia.org/wiki/Torsion_spring.

Agma Standard (1997). Design and selection of components for enclosed gear drives. Alexandria, VA: American Gear Manufacturers Association, pp. 1-48.

Third Party Observations for European Patent Application No. 11250208.3 filed Jul. 20, 2018. Dated Jul. 26, 2018.

Third Party Observations for European Patent Application No. 17199484.1 filed Jul. 5, 2018. Dated Jul. 12, 2018.

Third Party Observations for European Patent Application No. 13775188.9 filed Sep. 10, 2018. Dated Sep. 17, 2018.

Notice of Opposition for European Patent No. 3051078 filed Jul. 31, 2018.

Extended European Search Report for European Application No. 16155413.4 dated Jun. 23, 2016.

Litak, G. and Friswell, M.l. (2004). Dynamics of a gear system with faults in meshing stiffness. Nonlinear Dynamics (2005) 41: 415-421.

European Search Report for European Patent Application No. 16159312.4 completed Jun. 8, 2016.

European Search Report for European Application No. 16152821.1 completed Jun. 16, 2016.

Rauch, Dale, "Design Study of an Air Pump and Integral Lift Engine ALF-504 Using the Lycoming 502 Core," NASA Report CR-120992, Jul. 31, 1972.

International Preliminary Report on Patentability for International Application No. PCT/US2015/012346 dated Aug. 4, 2016.

Grzegroz, L. and Friswell, M. Dynamics of a gear system with faults in meshing stiffness. Nonlinear Dynamics (2005) 41. pp. 415-421.

European Search Report for European Patent Application No. 16174051 completed Oct. 21, 2016.

Patent Owner's Preliminary Response. *General Electric Company.*, Petitioner, v. *United Technologies Corp.*, Patent Owner IPR2017-00522. U.S. Pat. No. 8,899,915 Entered Apr. 19, 2017. pp. 1-54.

Mattingly, J.D. (1996). Elements of gas turbine propulsion. New York, New York: McGraw-Hill, Inc. preface, pp. 719-720, 727-731, 735-738, 928-929, and 936-937.

Red Aviation. Part or Material Certification Form for various engine components. Dated Apr. 5, 2017.

Rethinking jet engines to make commercial aviation less of a threat to the climate (and the human respiratory system). Fortune. Retrieved Sep. 29, 2016 from: http://beta.fortune.com/change-the-world/united-technologies-8.

Krauskopf, L. & Shumaker, L. (2014). GE exec says avoided geared design in jet engine battle with Pratt. Reuters. Sep. 15, 2014. http://www.reuters.com/article/US-general-electric-united-tech-engine-dUSKBNOHA2H620140915.

Grose, T.K. (2013). Reshaping flight for fuel efficiency: Five technologies on the runway. National Geographic. Retrieved Mar. 16, 2016 from: http://news.nationalgeographic.com/news/energy/2013/04/130423-reshaping-flight-for-fuel-efficiency.html.

August, R., "Dynamics of Planetary Gear Trains", NASA Contractor Report 3793, Cleveland State University, Jun. 1984.

Decision Denying Institution of Inter Partes Review. *General Electric Company.*, Petitioner, v. *United Technologies Corp.*, Patent Owner IPR2017-00522. U.S. Pat. No. 8,899,915. Entered Jun. 23, 2017. pp. 1-18.

European Search Report for European Patent Application No. 15777258.3 dated Apr. 10, 2017.

August, R. "Dynamics of Planetary Gear Trains", Jun. 1984, NASA Contractor Report 3793, p. 13-16.

Singapore Search Report and Written Opinion for Application No. 10201401514U dated May 26, 2017.

Warwick, G.(1993). Textron Lycoming LF507: Engine for Change. Flight International, p. 39-41, Aug. 31, 1993.

Du, S., "Modelling of spur gear mesh stiffness and static transmission error", 1998, Proc Instn Meeh Engrs, vol. 212 Part C.

Robert G. Parker and Jian Lin, "Modeling, Modal Properties, and Mesh Stiffness Variation Instabilities of Planetary Gears", May 2001, NASA Glenn Research Center, CR-2001-210939, ARL-CL-462.

Oscar Van Deventer, "Extreme Reduction—11 million to one gearing", Shapeways.com, accessed on Nov. 13, 2017, https://www.shapeways.com/product/EQJQZEVWU/extreme-reduction-11-million-to-one-gearing.

Kapelevich, "High Gear Ratio Epicyclic Drives Analysis", Jun. 2014, American Gear Manufacturers Association, geartechnology.com, pp. 62-67.

European Search Report for European Patent Application No. 17199484.1 dated Feb. 7, 2018.

Hill, P.G. and Peterson, C.R. (1970) Mechanics and Thermodynamics of Propulsion. Addison-Wesley Series in Aerospace Science. 1970. Chapter 9-4.

Hill, P.G. and Peterson, C.R. (1992) Mechanics and Thermodynamics of Propulsion. Second Edition, Addison-Wesley Publishing Company, 1992, pp. 400-406.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Adams, Eric. (2016) The World's Hugest Jet Engine is Wider Than a 737s Fuselage. Apr. 28, 2016. www.wired.com/2016/04/worlds-hugest-jet-engine-wider-737s-fuselage/ accessed on Apr. 28, 2016).

Jane's Aero-Engines, Issue Seven, Edited by Bill Gunston, Jane's Information Group Inc., Alexandria, Virginia, 2000, pp. 1-67, 464-470, 475-476, 482-488, 494-508, 510-512.

Safran Opposition(English Translation) dated May 28, 2019 for EP Patent No. 2949881.

(56) References Cited

OTHER PUBLICATIONS

Rolls-Royce Opposition dated May 28, 2019 for EP Patent No. 2949881.
Rolls-Royce Opposition dated Jul. 9, 2018 for EP Patent Application No. 16174051.9 EP3098396.
Mattingly, J.D. (1996). Elements of gas turbine propulsion. New York, New York: McGraw-Hill, Inc. pp. 1-18, 30-62, 85-87, 95-104, 121-123, 223-234, 242-245, 278-285, 303-309, 323-326, 462-479, 517-520, 563-565, 630-632, 368-670, 673-675, 682-685, 697-705, 726-727, 731-733, 802-805, 828-830, 862-864, and 923-927.
Preliminary Opinion of the Opposition Division in the opposition to patent EP2949882 dated Mar. 13, 2019.
Holder's Response to Written Opinion dated Sep. 29, 2015. European Patent Application No. 15175205.2 (2949882) dated Jun. 1, 2016.
Annex to the Notice un Article 94(3) EPC issued by the Examination Division. European Patent Application No. 13837107.5 dated Jan. 25, 2019.
Turbofan and Turbojet Engines, Data Handbook. Elodie Roux. p. 41-42, p. 465, p. 468-469.
Attestation of Didier Escure signed Sep. 17, 2018.
Attestation of Philippe Pellier signed Apr. 12, 2017.
Preliminary Opinion of the Opposition Division in the opposition to patent EP3051078 dated Apr. 16, 2019.
Observation filed by Rolls-Royce dated Oct. 29, 2018 for Patent No. EP2811120 (European Patent Application No. 14155460.0).
Response to Opposition for European Patent No. 2949882 (EP Application No. 15175205.2) dated Nov. 26, 2018.
Opposition Response Safran for European Patent No. 2949882 (EP Application No. 15175205.2) dated Mar. 20, 2019.
Observation filed by Rolls-Royce dated May 22, 2018 for European Patent No. EP2949882, (EP Application No. 15175205.2).
Opposition—further submission filed by Safran dated Mar. 12, 2019 for European Patent No. EP2949882, (EP Application No. 15175205. 2). English and French version.
Letter from the Opponent for European Patent Application No. 2811120 (14155460.0) dated Feb. 15, 2019 by Safran Aircraft Engines.
Product Brochure. The ALF 502R turbofan: technology, ecology, economy. Avco Lycoming TEXTRON.
Decision of the Opposition Division. European Patent No. 2949882 (Application No. 15175205.2) dated Nov. 26, 2018.
Wendus, B.E., Stark, D.F., Holler, R.P., and Funkhouser, M.E. (2003). Follow-on technology requirement study for advanced subsonic transport NASA/CR-2003-212467. pp. 1-37.
McMillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.
Kurzke, J. (2009) Fundamental differences between conventional and geared turbofans. Proceedings of ASME Turbo Expo: Power for Land, Sea, and Air. 2009, Orlando, Florida, pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference, pp. 1-10.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, DC.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp 1-103.
Moxon, J. How to save fuel in tomorrow's engines. Flight International. Jul. 30, 1983. 3873(124). pp. 272-273.
U.S. Appl. No. 12/131,876.
Fledderjohn, K.R. (1983). The TFE731-5: Evolution of a decade of business jet service. SAE Technical Paper Series Business Aircraft Meeting & Exposition. Wichita, Kansas. Apr. 12-15, 1983. pp 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

(56) References Cited

OTHER PUBLICATIONS

Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Kurzke, J. (2008). Preliminary Design, Aero-engine design: From state of the art turbofans towards innovative architectures. pp. 1-72.
Leckie, F.A. and Dal Bello, D.J. (2009). Strength and stiffness of engineering systems. Mechanical Engineering Series. Springer. pp. 1-3.
Declaration of Magdy Attia in re U.S. Pat. No. 8,899,915. Executed Dec. 13, 2016. pp. 1-71.
Declaration of Raymond Drago. In re U.S. Pat. No. 8,899,915. Executed Dec. 9, 2016. pp. 1-38.
Petition for Inter Partes Review of U.S. Pat. No. 8,899,915. *General Electric Company*, Petitioner, v *United Technologies Corporation*, Patent Owner. Filed Dec. 21, 2016.
Abhijit Guha, "Optimum Fan Pressure Ratio for Bypass Engines with Separate or Mixed Exhaust Streams", Sep.-Oct. 2001, Journal of Propulsion and Power 17(5), p. 1117-1122.
Type Certificate Data Sheet A23WE, Department of Transportation Federal Aviation Administration, Oct. 25, 2001, pp. 1-23.
Unicom, Flying Magazine, Nov. 2002, vol. 129, No. 11, p. 68.
Third Party Observations of European Patent Application No. 18191333.6 (EP 3467273) dated Mar. 9, 2020 by Rolls Royce.
Third Party Observations of European Patent Application No. 18191325.2 (EP 3608515) dated Mar. 10, 2020 by Rolls Royce.
Third Party Observations of European Patent Application No. 18191325.2 (EP 3608515) dated Mar. 6, 2020 by Rolls Royce.
European Search Report for European Patent Application No. 12170479.5 completed on Jun. 26, 2014.
Grzegorz Litak et al.: "Dynamics of a Gear System with Faults in Meshing Stiffness", Nonlinear Dynamics, Kluwer Academic Publishers, DO, vol. 41, No. 4, Sep. 1, 2005, pp. 415-421.
European Search Report for European Patent Application No. 12170483.7 completed on Apr. 29, 2014.
International Search Report and Written Opinion for International Application No. PCT/US2013/060105 completed on Jan. 30, 2014.
International Preliminary Report on Patentability for International Application No. PCT/US2013/060105 dated Apr. 2, 2015.
European Search Report for European Application No. 15152745.4 dated Jun. 15, 2015.
European Search Report for European Patent Application No. 15175203.7 dated Oct. 15, 2015.
European Search Report for European Patent Application No. 15175205.2 dated Oct. 15, 2015.
European Search Report for for European application No. 13828967.3 dated Oct. 14, 2014.
European Search Report for for European application No. 14155460.0 dated Sep. 2, 2014.
NASA, Engine Weight Model, Glenn Research Center, retrieved from, http://www.grc.nasa.gov/WWW/K-12/airplane/turbwt.html, Mar. 11, 2016.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 50-62, 85-87, 95-104, 121-123, 223-234, 242-245, 278-280, 303-309, 323-326, 462-479, 517-520, 563-565, 673-675, 582-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics, pp. 1-15.
Roux, E. (2007). Turbofan and turbojet engines database handbook. Editions Elodie Roux. Blagnac: France, pp. 1-595.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p 45-47.
Norton, M. and Karczub, D. (2003). Fundamentals of noise and vibration analysis for engineers. Press Syndicate of the University of Cambridge. New York: New York, p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.

(56) References Cited

OTHER PUBLICATIONS

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992 pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
El-Sayad, A.F. (2008). Aircraft propulsion and gas turbine engines. Boca Raton, FL: CRC Press. pp. 215-219 and 355-360.
Bunker, R.S. (2005). A review of shaped hole turbine film-cooling technology. Journal of Heat Transfer vol. 127. Apr. 2005. pp. 441-453.
Brief communication for EP Application No. 15175203.7 (U.S. Pat. No. 2,949,881) Opposition Proceedings Rolls Royce dated Mar. 25, 2021.
Brief communication for EP Application No. 15175203.7. (U.S. Pat. No. 2,949,881) Opposition Proceedings Safran English Translation dated Apr. 5, 2021.
Brief communication for EP Application No. 15175203.7. (U.S. Pat. No. 2,949,881) Opposition Proceedings Safran in French. Dated Mar. 25, 2021.
Appeal Decision—Reversed for IPR2018-01442. U.S. Pat. No. 9,695,751. *Raytheon Technologies Corporation* vs *General Electric Company.*
Reply to the Observations for European Patent No. EP3097275 (15777258.3) dated Aug. 18, 2021.

* cited by examiner

FLEXIBLE SUPPORT STRUCTURE FOR A GEARED ARCHITECTURE GAS TURBINE ENGINE

CROSS REFERENCE TO RELATED APPLICATIONS

The present disclosure is a continuation of U.S. patent application Ser. No. 15/185,292 filed Jun. 17, 2016, which is a continuation of U.S. patent application Ser. No. 13/938,466 filed Jul. 10, 2013, which is now U.S. Pat. No. 9,410,608 granted Aug. 9, 2016, which is a continuation of U.S. patent application Ser. No. 13/623,309, filed Sep. 20, 2012, which is now U.S. Pat. No. 9,133,729 granted Sep. 15, 2015, which is a continuation-in-part of U.S. patent application Ser. No. 13/342,508, filed Jan. 3, 2012, which is now U.S. Pat. No. 8,297,916 granted Oct. 30, 2012, which claims priority to U.S. Provisional Patent Application No. 61/494,453, filed Jun. 8, 2011.

BACKGROUND

The present disclosure relates to a gas turbine engine, and more particularly to a flexible support structure for a geared architecture therefor.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate. An advantage of epicyclic gear trains is that a rotary input can be connected to any one of the three elements. One of the other two elements is then held stationary with respect to the other two to permit the third to serve as an output.

In gas turbine engine applications, where a speed reduction transmission is required, the central sun gear generally receives rotary input from the powerplant, the outer ring gear is generally held stationary and the planet gear carrier rotates in the same direction as the sun gear to provide torque output at a reduced rotational speed. In star gear trains, the planet carrier is held stationary and the output shaft is driven by the ring gear in a direction opposite that of the sun gear.

During flight, light weight structural cases deflect with aero and maneuver loads causing significant amounts of transverse deflection commonly known as backbone bending of the engine. This deflection may cause the individual sun or planet gear's axis of rotation to lose parallelism with the central axis. This deflection may result in some misalignment at gear train journal bearings and at the gear teeth mesh, which may lead to efficiency losses from the misalignment and potential reduced life from increases in the concentrated stresses.

SUMMARY

In one exemplary embodiment, a geared architecture for a gas turbine engine includes a fan shaft and a frame which supports said fan shaft. The frame defines a frame stiffness. A plurality of gears drives the fan shaft and includes a gear mesh that defines a gear mesh stiffness. A stiffness of a ring gear of the plurality of gears is less than about 20% of the gear mesh stiffness. A flexible support supports the geared architecture and defines a flexible support stiffness. An input coupling to the plurality of gears defines an input coupling stiffness. The flexible support stiffness and the input coupling stiffness are each less than about 11% of the frame stiffness.

In a further embodiment of any of the above, the frame and the flexible support are mounted to a static structure of a gas turbine engine.

In a further embodiment of any of the above, the input coupling is mounted to a sun gear of the gear system.

In a further embodiment of any of the above, the fan shaft is mounted to a ring gear of the gear system.

In a further embodiment of any of the above, the plurality of gears are form a star system.

In a further embodiment of any of the above, the fan shaft is mounted to a planet carrier of the gear system.

In a further embodiment of any of the above, the flexible support stiffness is less than about 8% of the gear mesh stiffness.

In a further embodiment of any of the above, the input coupling stiffness is less than about 5% of the gear mesh stiffness.

In a further embodiment of any of the above, the flexible support stiffness defines at least one of a lateral stiffness and a transverse stiffness. The gear mesh stiffness defines at least one of a lateral stiffness and a transverse stiffness. The input coupling stiffness defines at least one of a lateral stiffness and a transverse stiffness.

In a further embodiment of any of the above, the lateral stiffness refers to a perpendicular direction with respect to an axis of rotation of the gas turbine engine. The transverse stiffness refers to a pivotal bending movement with respect to the axis of rotation of the gas turbine engine.

In a further embodiment of any of the above, the frame which supports the fan shaft and defines the frame stiffness is a K-frame bearing support which supports a bearing system that supports the fan shaft.

In a further embodiment of any of the above, the flexible support stiffness is less than the gear mesh stiffness.

In a further embodiment of any of the above, the input coupling stiffness is less than the gear mesh stiffness.

In another exemplary embodiment, a geared architecture for a gas turbine engine includes a fan shaft and a frame which supports the fan shaft. The frame defines a frame stiffness. A plurality of gears which drives the fan shaft includes a gear mesh that defines a gear mesh stiffness. At least one of a lateral stiffness and a transverse stiffness of a ring gear of the plurality of gears is less than about 12% of the gear mesh stiffness. A flexible support supports the geared architecture and defines a flexible support stiffness that is less than the gear mesh stiffness. An input coupling to the plurality of gears defines an input coupling stiffness that is less than the gear mesh stiffness. The flexible support stiffness and the input coupling stiffness are each less than 11% of the frame stiffness.

In a further embodiment of any of the above, the flexible support stiffness is less than about 8% of the gear mesh stiffness.

In a further embodiment of any of the above, the input coupling stiffness is less than about 5% of the gear mesh stiffness.

In a further embodiment of any of the above, the flexible support supports a carrier of the geared architecture.

In a further embodiment of any of the above, the flexible support supports a ring gear of the geared architecture.

In a further embodiment of any of the above, the flexible support stiffness defines at least one of a lateral stiffness and a transverse stiffness. The gear mesh stiffness defines at least one of a lateral stiffness and a transverse stiffness. The input coupling stiffness defines at least one of a lateral stiffness and a transverse stiffness.

In a further embodiment of any of the above, the lateral stiffness refers to a perpendicular direction with respect to an axis of rotation of the gas turbine engine. The transverse stiffness refers to a pivotal bending movement with respect to the axis of rotation of the gas turbine engine.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
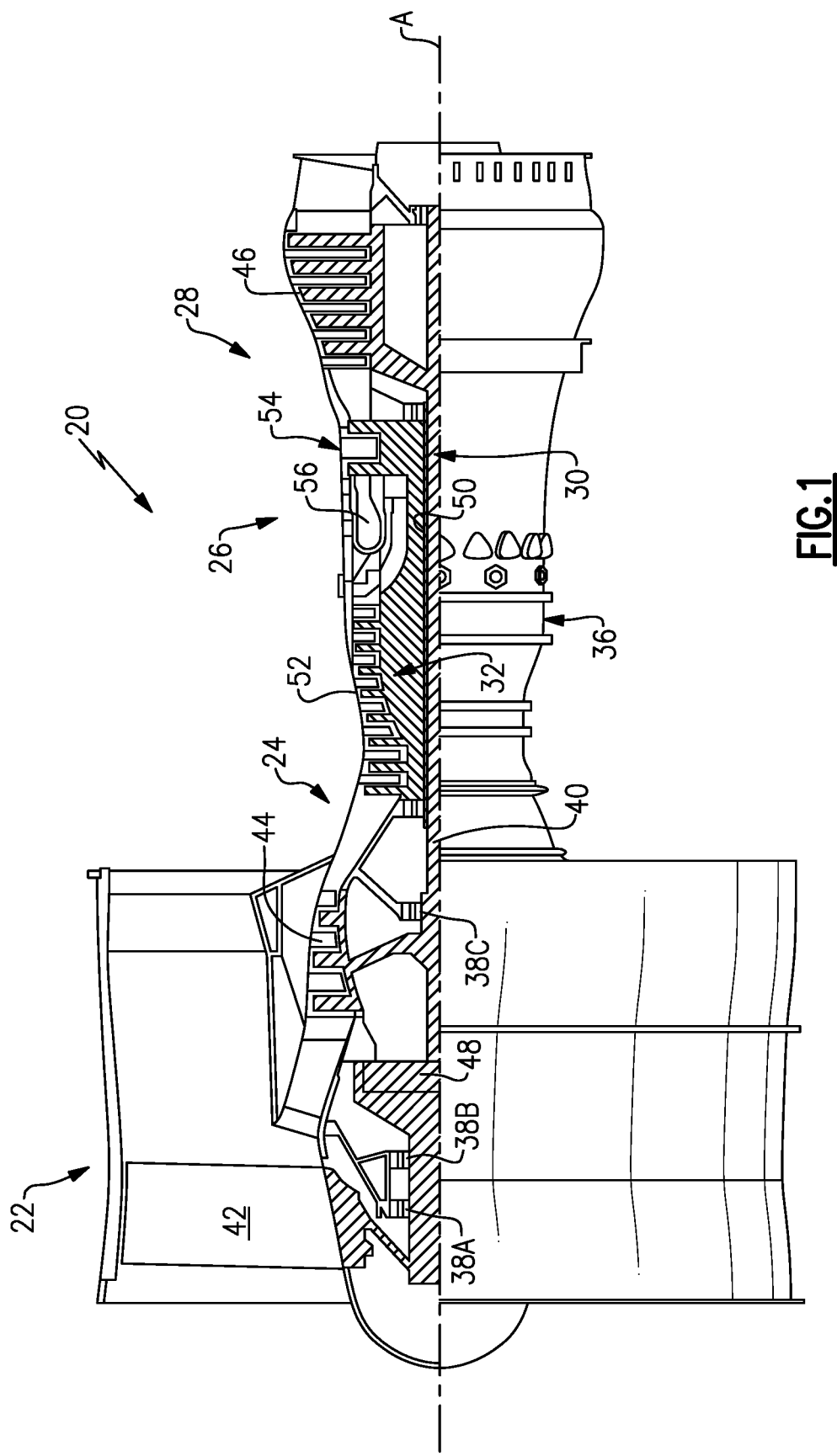
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool architecture gas turbine engine and an open rotor (unducted fan) engine.

The engine 20 generally includes a low speed spool 30 and a high speed spool 32 mounted for rotation about an engine central longitudinal axis A relative to an engine static structure 36 via several bearing systems 38A-38C. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion of the airflow passing therethrough.

Figure 2:
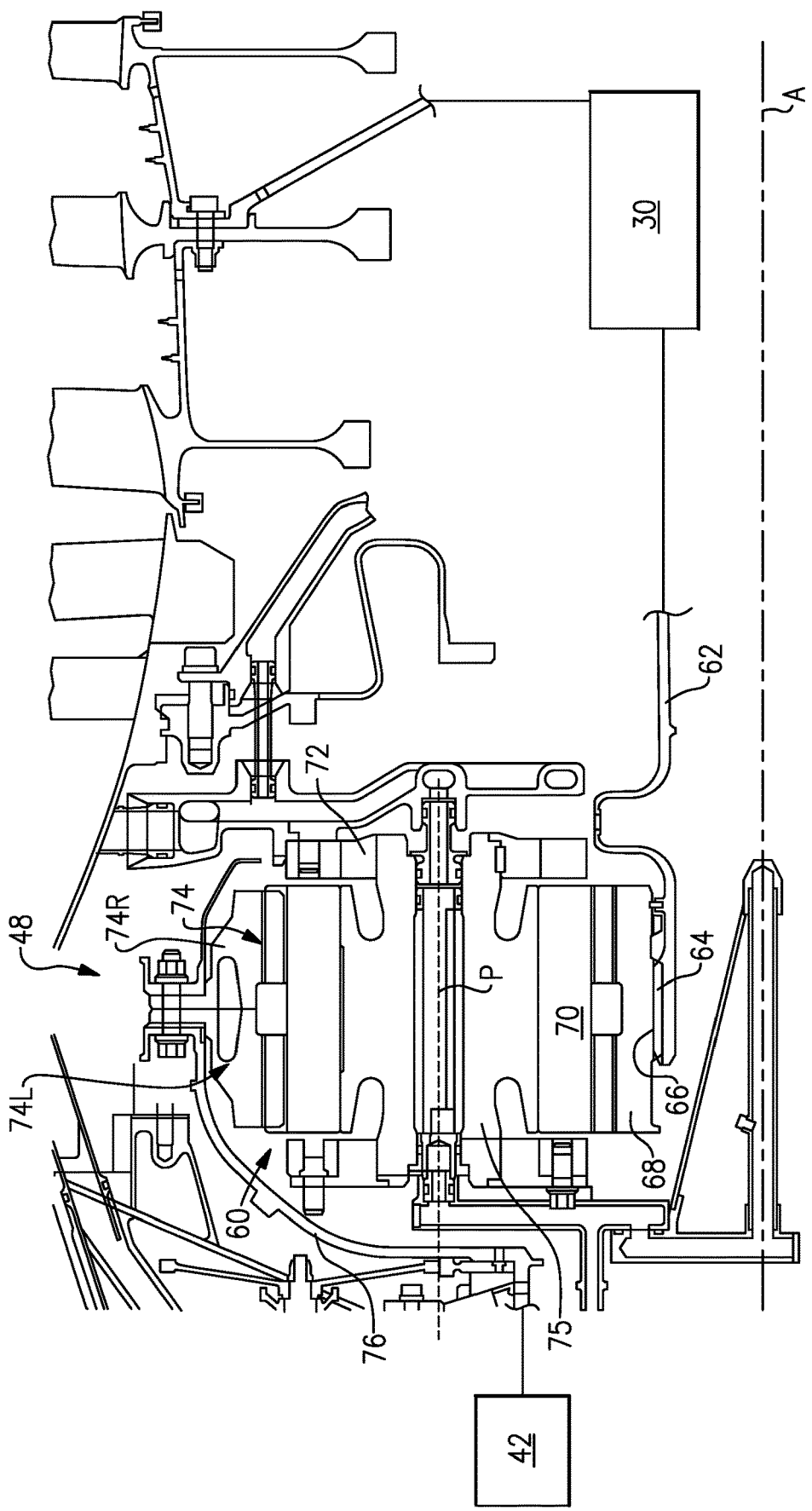
FIG. 2 is an enlarged cross-section of a section of the gas turbine engine which illustrates a fan drive gear system (FDGS)

With reference to FIG. 2, the geared architecture 48 generally includes a fan drive gear system (FDGS) 60 driven by the low speed spool 30 (illustrated schematically) through an input coupling 62. The input coupling 62 both transfers torque from the low speed spool 30 to the geared architecture 48 and facilitates the segregation of vibrations and other transients therebetween. In the disclosed non-limiting embodiment, the FDGS 60 may include an epicyclic gear system which may be, for example, a star system or a planet system.

The input coupling 62 may include an interface spline 64 joined, by a gear spline 66, to a sun gear 68 of the FDGS 60. The sun gear 68 is in meshed engagement with multiple planet gears 70, of which the illustrated planet gear 70 is representative. Each planet gear 70 is rotatably mounted in a planet carrier 72 by a respective planet journal bearing 75. Rotary motion of the sun gear 68 urges each planet gear 70 to rotate about a respective longitudinal axis P.

Each planet gear 70 is also in meshed engagement with rotating ring gear 74 that is mechanically connected to a fan shaft 76. Since the planet gears 70 mesh with both the rotating ring gear 74 as well as the rotating sun gear 68, the planet gears 70 rotate about their own axes to drive the ring gear 74 to rotate about engine axis A. The rotation of the ring gear 74 is conveyed to the fan 42 (FIG. 1) through the fan shaft 76 to thereby drive the fan 42 at a lower speed than the low speed spool 30. It should be understood that the described geared architecture 48 is but a single non-limiting embodiment and that various other geared architectures will alternatively benefit herefrom.

Figure 3:
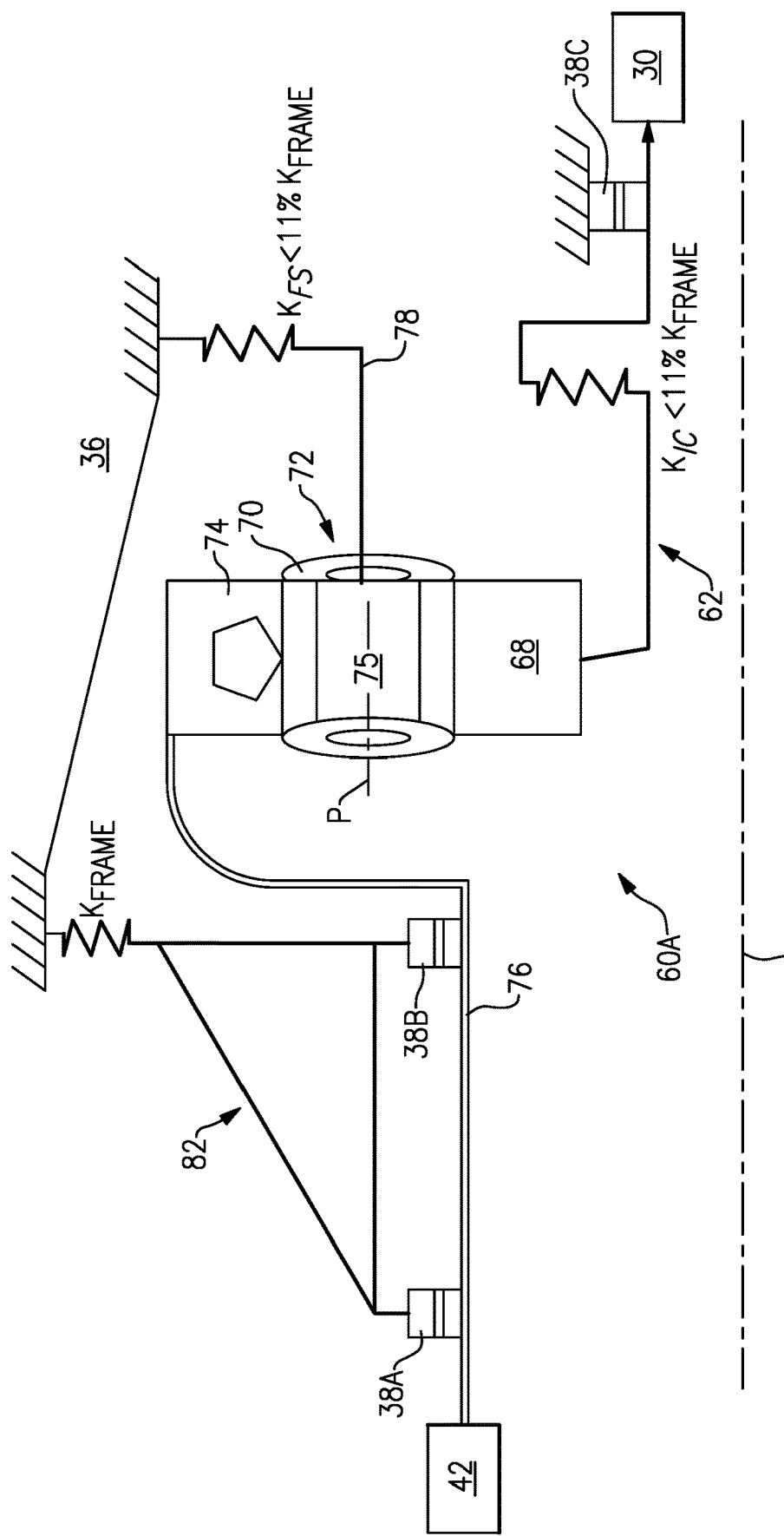
FIG. 3 is a schematic view of a flex mount arrangement for one non-limiting embodiment of the FDGS.

With reference to FIG. 3, a flexible support 78 supports the planet carrier 72 to at least partially support the FDGS 60A with respect to the static structure 36 such as a front center body which facilitates the segregation of vibrations and other transients therebetween. It should be understood that various gas turbine engine case structures may alternatively or additionally provide the static structure and flexible support 78. It is to be understood that the term "lateral" as used herein refers to a perpendicular direction with respect to the axis of rotation A and the term "transverse" refers to a pivotal bending movement with respect to the axis of rotation A so as to absorb deflections which may be otherwise applied to the FDGS 60. The static structure 36 may further include a number 1 and 1.5 bearing support static structure 82 which is commonly referred to as a "K-frame" which supports the number 1 and number 1.5 bearing systems 38A. 38B. Notably, the K-frame bearing support defines a lateral stiffness (represented as Kframe in FIG. 3) and a transverse stiffness (represented as Kframe$^{BEND}$ in FIG. 3) as the referenced factors in this non-limiting embodiment.

In this disclosed non-limiting embodiment, the lateral stiffness (KFS; KIC) of both the flexible support 78 and the input coupling 62 are each less than about 11% of the lateral stiffness (Kframe). That is, the lateral stiffness of the entire FDGS 60 is controlled by this lateral stiffness relationship. Alternatively, or in addition to this relationship, the transverse stiffness of both the flexible support 78 and the input coupling 62 are each less than about 11% of the transverse stiffness (Kframe$^{BEND}$). That is, the transverse stiffness of the entire FDGS 60 is controlled by this transverse stiffness relationship.

Figure 4:
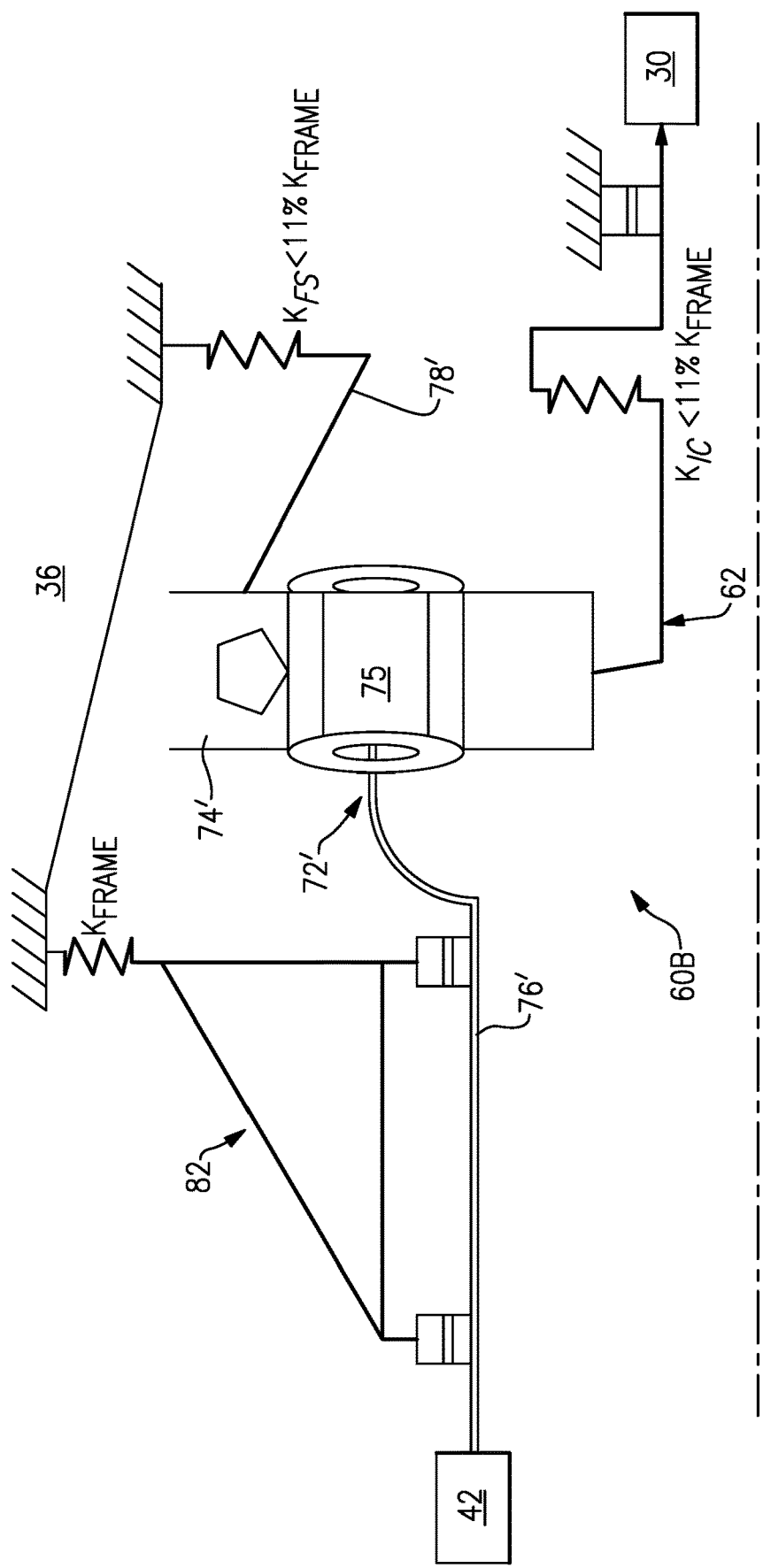
FIG. 4 is a schematic view of a flex mount arrangement for another non-limiting embodiment of the FDGS.

With reference to FIG. 4, another non-limiting embodiment of a FDGS 60B includes a flexible support 78' that supports a rotationally fixed ring gear 74'. The fan shaft 76' is driven by the planet carrier 72' in the schematically illustrated planet system which otherwise generally follows the star system architecture of FIG. 3.

Figure 5:
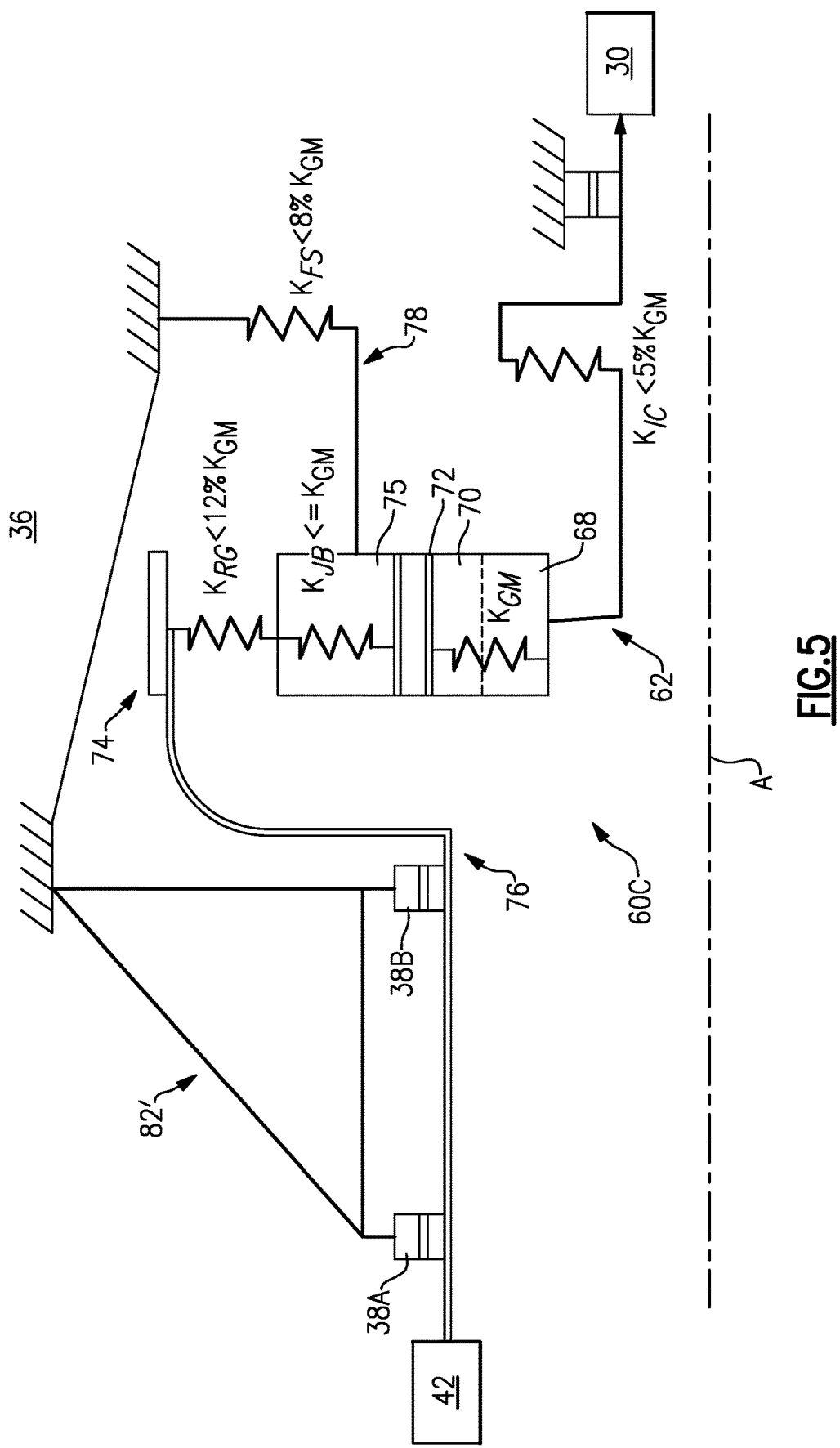
FIG. 5 is a schematic view of a flex mount arrangement for another non-limiting embodiment of a star system FDGS.

With reference to FIG. 5, the lateral stiffness relationship within a FDGS 60C itself (for a star system architecture) is schematically represented. The lateral stiffness (KIC) of an input coupling 62, a lateral stiffness (KFS) of a flexible support 78, a lateral stiffness (KRG) of a ring gear 74 and a lateral stiffness (KJB) of a planet journal bearing 75 are controlled with respect to a lateral stiffness (KGM) of a gear mesh within the FDGS 60.

In the disclosed non-limiting embodiment, the stiffness (KGM) may be defined by the gear mesh between the sun gear 68 and the multiple planet gears 70. The lateral stiffness (KGM) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The lateral stiffness (KJB) may be mechanically defined by, for example, the stiffness within the planet journal bearing 75 and the lateral stiffness (KRG) of the ring gear 74 may be mechanically defined by, for example, the geometry of the ring gear wings 74L, 74R (FIG. 2).

In the disclosed non-limiting embodiment, the lateral stiffness (KRG) of the ring gear 74 is less than about 12% of the lateral stiffness (KGM) of the gear mesh; the lateral stiffness (KFS) of the flexible support 78 is less than about 8% of the lateral stiffness (KGM) of the gear mesh; the lateral stiffness (KJB) of the planet journal bearing 75 is less than or equal to the lateral stiffness (KGM) of the gear mesh; and the lateral stiffness (KIC) of an input coupling 62 is less than about 5% of the lateral stiffness (KGM) of the gear mesh.

Figure 6:
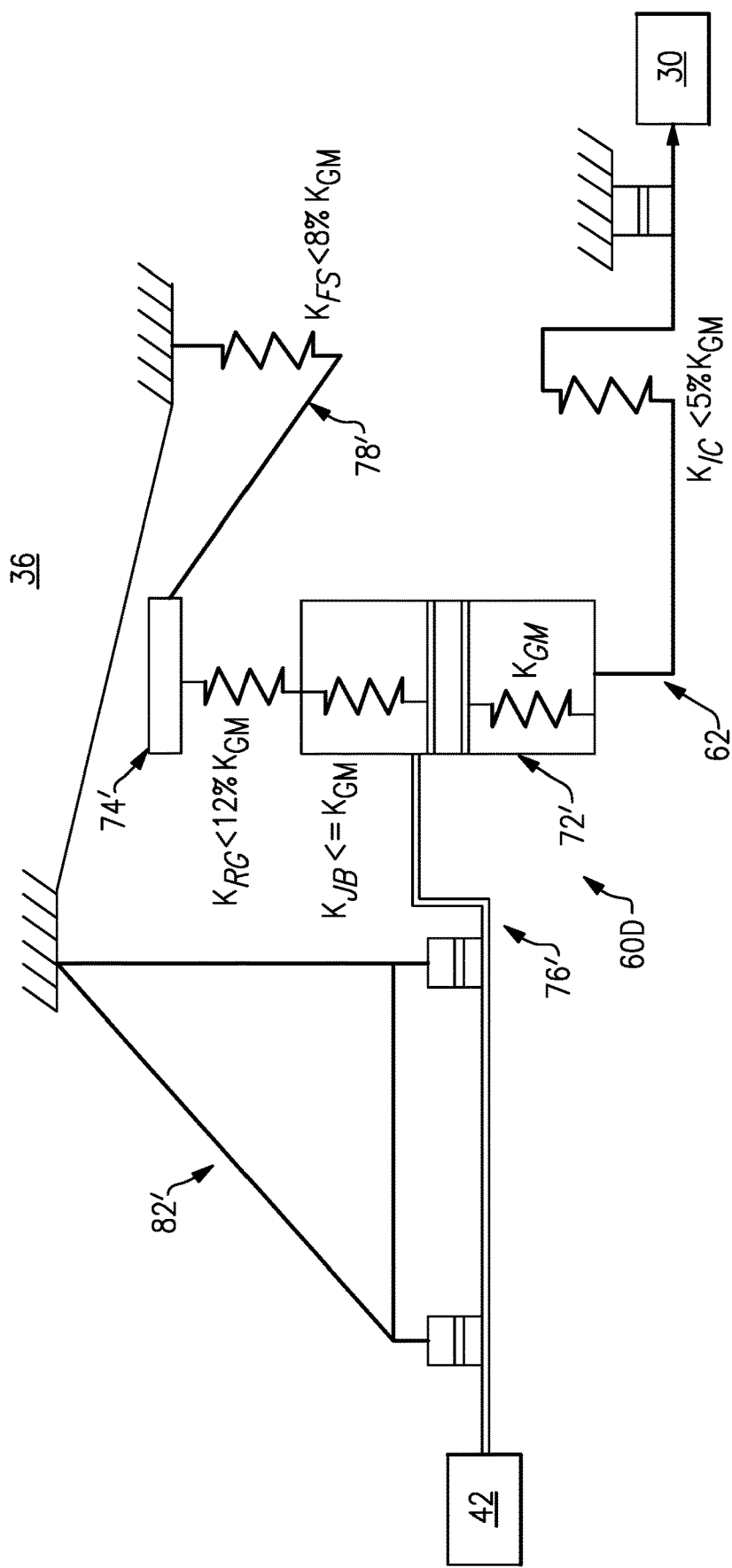
FIG. 6 is a schematic view of a flex mount arrangement for another non-limiting embodiment of a planetary system FDGS.

With reference to FIG. 6, another non-limiting embodiment of a lateral stiffness relationship within a FDGS 60D itself are schematically illustrated for a planetary gear system architecture, which otherwise generally follows the star system architecture of FIG. 5.

It should be understood that combinations of the above lateral stiffness relationships may be utilized as well. The lateral stiffness of each of structural components may be readily measured as compared to film stiffness and spline stiffness which may be relatively difficult to determine.

By flex mounting to accommodate misalignment of the shafts under design loads, the FDGS design loads have been reduced by more than 17% which reduces overall engine weight. The flex mount facilitates alignment to increase system life and reliability. The lateral flexibility in the flexible support and input coupling allows the FDGS to essentially 'float' with the fan shaft during maneuvers. This allows: (a) the torque transmissions in the fan shaft, the input coupling and the flexible support to remain constant during maneuvers; (b) maneuver induced lateral loads in the fan shaft (which may otherwise potentially misalign gears and damage teeth) to be mainly reacted to through the number 1 and 1.5 bearing support K-frame; and (c) both the flexible support and the input coupling to transmit small amounts of lateral loads into the FDGS. The splines, gear tooth stiffness, journal bearings, and ring gear ligaments are specifically designed to minimize gear tooth stress variations during maneuvers. The other connections to the FDGS are flexible mounts (turbine coupling, case flex mount). These mount spring rates have been determined from analysis and proven in rig and flight testing to isolate the gears from engine maneuver loads. In addition, the planet journal bearing spring rate may also be controlled to support system flexibility.

Figure 7:
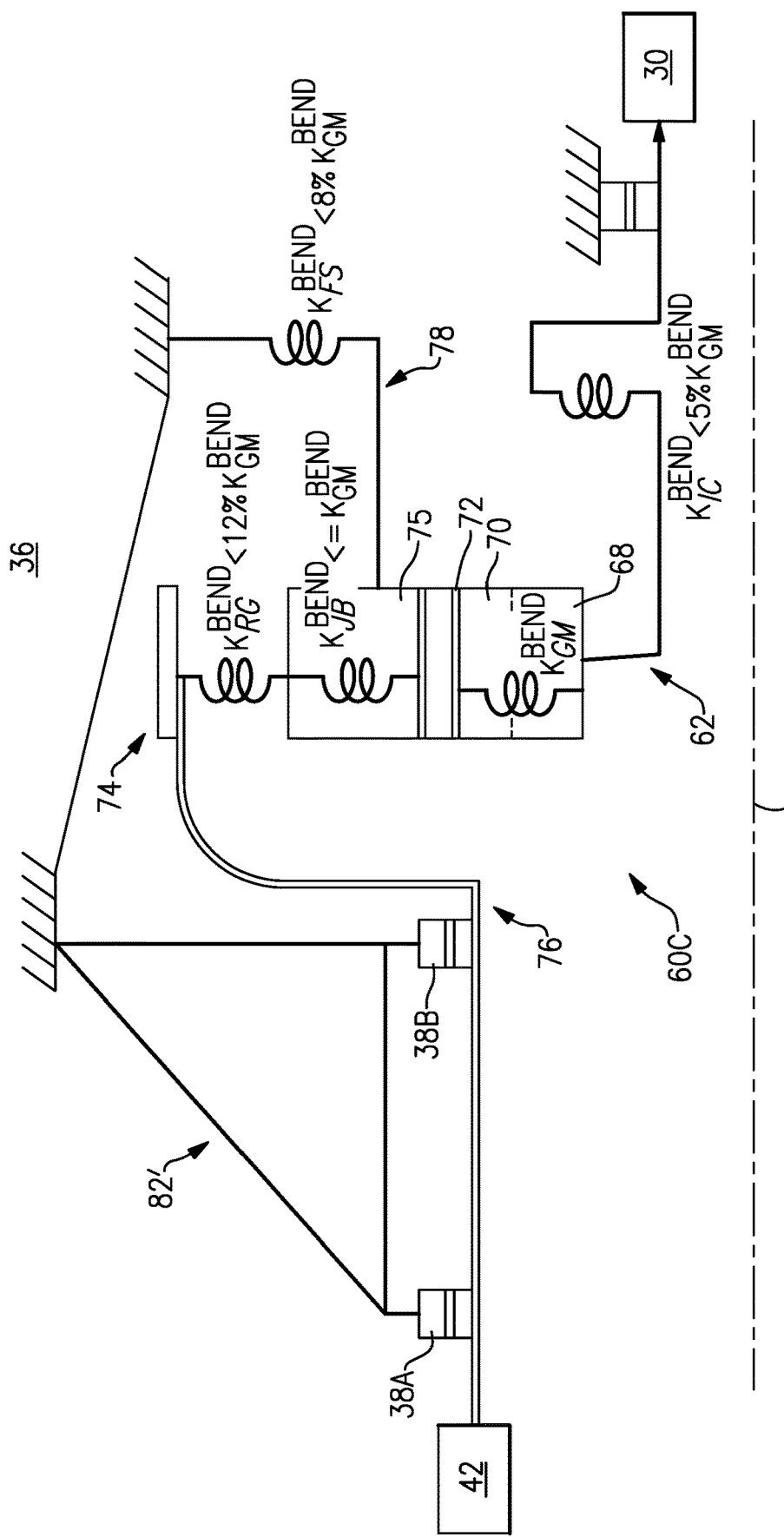
FIG. 7 is a schematic view of a flex mount arrangement for another non-limiting embodiment of a star system FDGS.

FIG. 7 is similar to FIG. 5 but shows the transverse stiffness relationships within the FDGS 60C (for a star system architecture). The transverse stiffness (KIC$^{BEND}$) of the input coupling 62, a transverse stiffness (KFS$^{BEND}$) of the flexible support 78, a transverse stiffness (KRG$^{BEND}$) of the ring gear 74 and a transverse stiffness (KJB$^{BEND}$) of the planet journal bearing 75 are controlled with respect to a transverse stiffness (KGM$^{BEND}$) of the gear mesh within the FDGS 60.

In the disclosed non-limiting embodiment, the stiffness (KGM$^{BEND}$) may be defined by the gear mesh between the sun gear 68 and the multiple planet gears 70. The transverse stiffness (KGM$^{BEND}$) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The transverse stiffness (KJB$^{BEND}$) may be mechanically defined by, for example, the stiffness within the planet journal bearing 75 and the transverse stiffness (KRG$^{BEND}$) of the ring gear 74 may be mechanically defined by, for example, the geometry of the ring gear wings 74L, 74R (FIG. 2).

In the disclosed non-limiting embodiment, the transverse stiffness (KRG$^{BEND}$) of the ring gear 74 is less than about 12% of the transverse stiffness (KGM$^{BEND}$) of the gear mesh; the transverse stiffness (KFS$^{BEND}$) of the flexible support 78 is less than about 8% of the transverse stiffness (KGM$^{BEND}$) of the gear mesh; the transverse stiffness (KJB$^{BEND}$) of the planet journal bearing 75 is less than or equal to the transverse stiffness (KGM$^{BEND}$) of the gear mesh; and the transverse stiffness (KIC$^{BEND}$) of an input coupling 62 is less than about 5% of the transverse stiffness (KGM$^{BEND}$) of the gear mesh.

Figure 8:
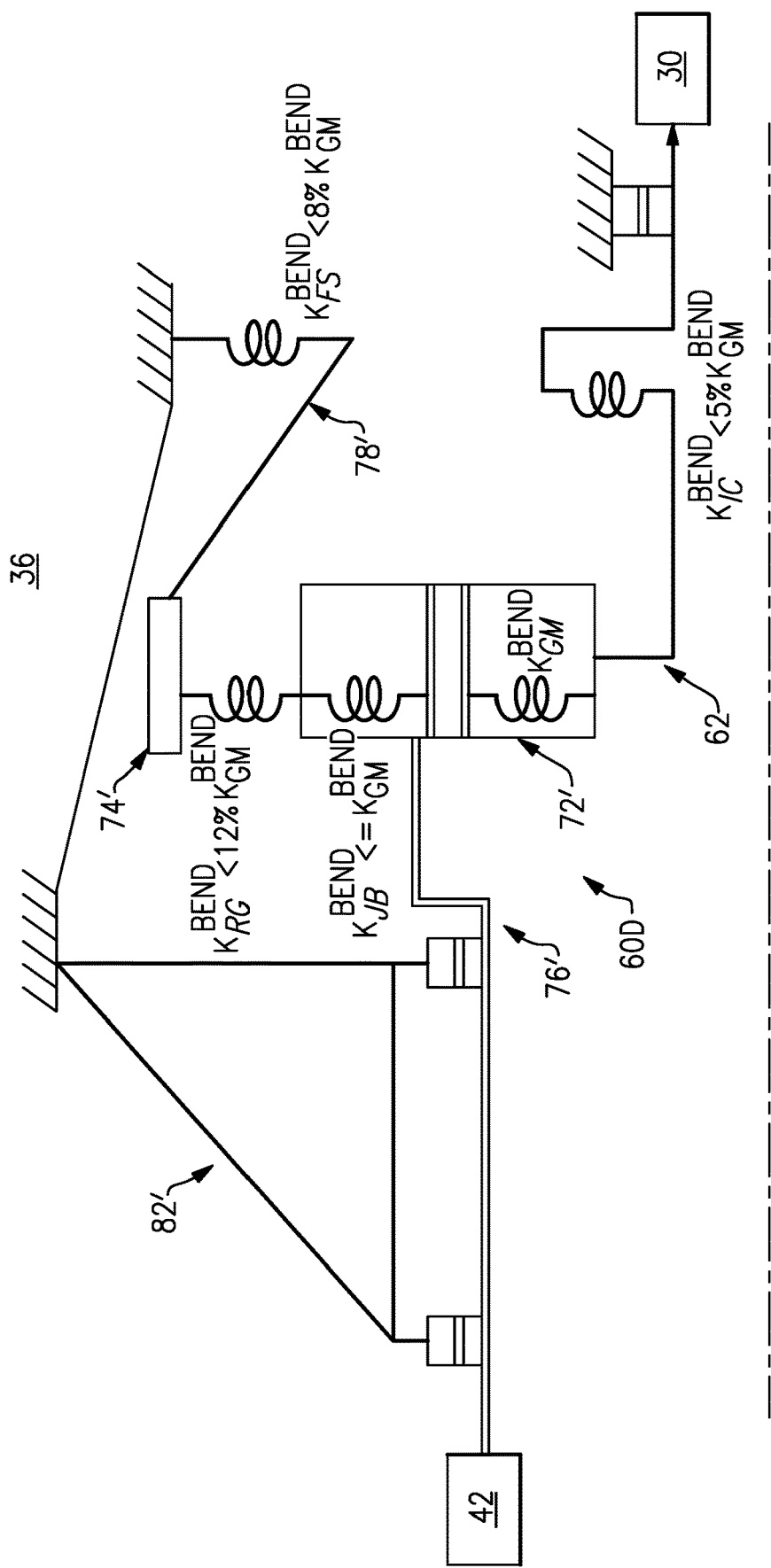
FIG. 8 is a schematic view of a flex mount arrangement for another non-limiting embodiment of a planetary system FDGS.

FIG. 8 is similar to FIG. 6 but shows the transverse stiffness relationship within the FDGS 60D for the planetary gear system architecture.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine, comprising:
a fan shaft driving a fan having fan blades, wherein the fan delivers airflow to a bypass duct;
a gear system connected to said fan shaft and driven through an input defining an input lateral stiffness and an input transverse stiffness, said gear system includes a gear mesh defining a gear mesh lateral stiffness;
a gear system flex mount arrangement, wherein said gear system flex mount arrangement accommodates misalignment of said fan shaft and said input during operation; and
a frame for supporting said fan shaft defining a frame lateral stiffness and a frame transverse stiffness, wherein said input lateral stiffness is less than 11% of said frame lateral stiffness and less than 5% of said gear mesh lateral stiffness.

2. The gas turbine engine of claim 1, wherein said gear system includes a ring gear defining a ring gear lateral stiffness that is less than 12% of said gear mesh lateral stiffness.

3. The gas turbine engine of claim 2, wherein said gear system flex mount arrangement further includes a flexible support defining a flexible support transverse stiffness and said flexible support transverse stiffness is less than 11% of said frame transverse stiffness.

4. The gas turbine engine of claim 3, further comprising a two stage high pressure turbine and the bypass duct is at least partially defined by a housing outward of the fan.

5. The gas turbine engine of claim 4, wherein said flexible support define a flexible support lateral stiffness that is less than 11% of said frame lateral stiffness.

6. The gas turbine engine of claim 1, wherein said gear system includes a ring gear defining a ring gear transverse stiffness and said gear mesh define a gear mesh transverse stiffness and said ring gear transverse stiffness is less than 12% of said gear mesh transverse stiffness.

7. The gas turbine engine of claim 6, wherein said input transverse stiffness is less than 5% of said gear mesh transverse stiffness.

8. The gas turbine engine of claim 2, wherein said ring gear define a ring gear transverse stiffness and said gear mesh defines a gear mesh transverse stiffness and said ring gear transverse stiffness is less than 12% of said gear mesh transverse stiffness.

9. The gas turbine engine of claim 1, wherein said gear system flex mount arrangement includes a flexible support defining a flexible support lateral stiffness that is less than 11% of said frame lateral stiffness.

10. The gas turbine engine of claim 9, wherein said gear mesh define a gear mesh transverse stiffness, and said input transverse stiffness is less than 5% of said gear mesh transverse stiffness.

11. The gas turbine engine of claim 10, wherein said gear system includes a ring gear defining a ring gear lateral stiffness less that 12% of said gear mesh lateral stiffness.

12. A gas turbine engine, comprising:
a fan shaft driving a fan having fan blades, wherein the fan delivers airflow to a bypass duct;
a gear system drivingly connected to said fan shaft, said gear system includes a ring gear defining a ring gear lateral stiffness and a gear mesh defining gear mesh lateral stiffness and a gear mesh transverse stiffness;
a flexible support defining a flexible support lateral stiffness and a flexible support transverse stiffness; and
wherein said ring gear lateral stiffness is less than 12% of said gear mesh lateral stiffness and at least one of said flexible support lateral stiffness and said flexible support transverse stiffness is less than 8% of a respective one of said gear mesh lateral stiffness and said gear mesh transverse stiffness.

13. The gas turbine engine of claim 12, wherein said flexible support transverse stiffness is less than 8% of said gear mesh transverse stiffness.

14. The gas turbine engine of claim 13, wherein said flexible support lateral stiffness is less than 8% of said gear mesh lateral stiffness.

15. The gas turbine engine of claim 12, wherein a fan shaft support defines a fan shaft support lateral stiffness and a fan shaft support transverse stiffness and at least one of said flexible support lateral stiffness and said flexible support transverse stiffness is less than 11% of a respective one of said fan shaft support lateral stiffness and said fan shaft support transverse stiffness.

16. The gas turbine engine of claim 15, wherein said flexible support transverse stiffness is less than 11% of said fan shaft support transverse stiffness.

17. The gas turbine engine of claim 16, wherein the flexible support lateral stiffness is less than 11% of said fan shaft support lateral stiffness.

18. The gas turbine engine of claim 17, wherein said flexible support lateral stiffness and said flexible support transverse stiffness are less than 8% of a respective one of said gear mesh lateral stiffness and said gear mesh transverse stiffness.

19. The gas turbine engine of claim 12, further comprising a two stage high pressure turbine and the bypass duct is at least partially defined by a housing outward of the fan.

20. A gas turbine engine, comprising:
a fan shaft driving a fan having fan blades, wherein the fan delivers airflow to a bypass duct;
a frame supporting said fan shaft and defining a frame lateral stiffness and a frame transverse stiffness;
a gear system connected to said fan shaft and driven through an input wherein said input to said gear system defines an input lateral stiffness; and
a gear system flex mount arrangement, wherein said flex mount arrangement accommodates misalignment of said fan shaft and said input during operation and includes a flexible support defining a flexible support lateral stiffness and a flexible support transverse stiffness and the flexible support lateral stiffness is less than 11% of said frame lateral stiffness and the flexible support transverse stiffness is less than 11% of said frame transverse stiffness.

21. The gas turbine engine of claim 20, wherein said gear system includes a gear mesh defining a gear mesh lateral stiffness and said flexible support lateral stiffness is less than 8% of said gear mesh lateral stiffness.

22. The gas turbine engine of claim 21, wherein said gear system includes a ring gear defining a ring gear lateral stiffness that is less than 12% of said gear mesh lateral stiffness.

23. The gas turbine engine of claim 22, wherein said gear mesh defines a gear mesh transverse stiffness, and said flexible support transverse stiffness is less than 8% of said gear mesh transverse stiffness.

24. The gas turbine engine of claim 23, wherein said ring gear defines a ring gear transverse stiffness and said ring gear transverse stiffness is less than 12% of said gear mesh transverse stiffness.

25. The gas turbine engine of claim 24, further comprising a two stage high pressure turbine and the bypass duct is at least partially defined by a housing outward of the fan.

26. The gas turbine engine of claim 22, wherein said input lateral stiffness is less than 5% of said gear mesh lateral stiffness.

27. The gas turbine engine of claim 26, further comprising a journal bearing defining a journal bearing lateral stiffness that is less than said gear mesh lateral stiffness.

* * * * *